(12) United States Patent
Chen et al.

(10) Patent No.: US 7,313,195 B2
(45) Date of Patent: Dec. 25, 2007

(54) PAPR REDUCTION METHOD USING BIT REALLOCATION

(75) Inventors: Yen-lun Chen, Kaohsiung (TW); Yumin Lee, Taipei (TW); Shih-Kai Lee, Bali Township, Taipei County (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 711 days.

(21) Appl. No.: 10/773,179

(22) Filed: Feb. 9, 2004

(65) Prior Publication Data

US 2005/0018702 A1    Jan. 27, 2005

(30) Foreign Application Priority Data

Jul. 9, 2003    (TW) ............................... 92118769 A

(51) Int. Cl.
*H04K 1/02* (2006.01)
(52) U.S. Cl. ...................................... 375/295; 375/286

(58) Field of Classification Search .............. 375/260, 375/261, 285, 295, 296; 370/208, 209, 210
See application file for complete search history.

(56) References Cited

U.S. PATENT DOCUMENTS

| | | | |
|---|---|---|---|
| 5,835,536 A * | 11/1998 | May et al. ................... 375/260 |
| 7,035,408 B2 * | 4/2006 | Antoine ........................ 380/47 |
| 7,177,350 B1 * | 2/2007 | Long et al. .................. 375/222 |
| 2004/0093545 A1 * | 5/2004 | Khandani et al. ........... 714/746 |
| 2004/0141548 A1 * | 7/2004 | Shattil ......................... 375/146 |

* cited by examiner

*Primary Examiner*—Emmanuel Bayard
(74) *Attorney, Agent, or Firm*—Bacon & Thomas, PLLC

(57) ABSTRACT

A PAPR reduction method using bit reallocation is disclosed, which is applied in a multi-carrier system. The lowest total transmission power P is achieved by a bit loading algorithm conditioned on the requirement of total D transmission bits per block. When the PAPR (peak to average power ratio) of the block is larger than a predetermined value A, the bit reallocation is performed to add $\Delta d$-bit transmitting data to one sub-carrier and subtract $\Delta d$-bit transmitting data from another sub-carrier, thereby continuing bit reallocation until the PAPR meets with the system requirement or an iteration number reaches a predetermined maximal number of iteration L.

15 Claims, 7 Drawing Sheets

PAPR REDUCTION METHOD USING BIT REALLOCATION

BACKGROUND OF THE INVENTION

1. Field of the Invention

The present invention relates to a peak to average power ratio (PAPR) reduction method and, more particularly, to a peak to average power ratio (PAPR) reduction method using bit reallocation, adapted for fields including a multi-carrier system or an orthogonal frequency division multiplexing (OFDM) system and the like.

2. Description of Related Art

In recent years, because a multi-carrier system, such as an OFDM system, can overcome multi-path interference and also increase spectral efficiency without using complicated transmitters and receivers, it is widely applied in many communication systems such as ADSL, DAB, DVB, WLAN (IEEE 802.11a, HiperLAN/2), WMAN (IEEE 802.16a) and the like.

A bit loading technique is typically used to increase the capacity of a multi-carrier system. Namely, after power allocation for transmissions at different sub-carriers (sub-channels) is determined, the transmissible information (i.e., the number of bits) and a mechanism of corresponding signal constellations at different sub-carriers are determined. FIG. 1 is a graph illustrating a typical Water-filling technique used for power allocation to achieve channel capacity and best spectral efficiency in a frequency selective channel. As shown in FIG. 1, for an AWGN channel, its frequency response is constant at all sub-carriers. Thus, information carried at each sub-carrier is allocated with same power to achieve channel capacity. However, for a multi-path frequency selective fading channel or any time varying channel, the channel capacity may not be achieved by the cited constant power allocation. Accordingly, a Water-filling technique is applied for transmissions over these channels.

As shown in FIG. 1, the frequency response of a frequency selective channel is divided into N frequency segments. The frequency response of each segment can be regarded to be constant for a multi-carrier system. Furthermore, in a multi-carrier system, one sub-carrier carries information over one frequency segment. If the frequency response is $h_1, h_2, \ldots, h_N$ respectively at the N sub-carriers and the power spectrum density (PSD) of noise is $\sigma_1^2, \sigma_2^2, \ldots \sigma_N^2$ respectively in the N sub-carriers, the channel signal to noise ratio (CNR) can be defined as:

$$\gamma_i = \frac{|h_i|^2}{\sigma_i^2}, i = 1, 2, \cdots, N.$$

For a $$\frac{1}{\gamma_i}$$

to frequency graph as shown in FIG. 1, assumed that water is injected into along the curve, the amount of water at the peak of the curve is less than that at the valleys. At this point, the amount of water represents the transmission power $P_i$ at each sub-carrier to be allocated.

After power allocation for transmissions at all sub-carriers is determined, a bit loading technique is applied to determine the transmissible number of bits at different sub-carriers. FIG. 2 shows a schematic diagram of functional blocks of a transmitting end in which an adaptive bit loading technique is applied. In FIG. 2, the transmitting end includes an adaptive constellation mapping unit 11, an adaptive bit loading unit 12, a serial to parallel (S/P) unit 13, an inverse fast Fourier transform (IFFT) unit 14, and a parallel to serial (P/S) unit 15. As shown in FIG. 2, the number of bits carried at different sub-carriers can be adjusted in dynamic against a time varying channel. Let B be the system transmission bandwidth, $\Delta f$ be the frequency difference between any two adjacent sub-carriers and N be the number of sub-carriers, thus $$B = N * \Delta f.$$

The total transmission power P for the system can be computed by the equation of:

$$P = \sum_{i=1}^{N} P_i,$$

where $P_i$ is the transmission power at the i-th sub-carrier and $1 \leq i \leq N$. In addition, the total number of bits R per signal block transmitted by the system with transmission bandwidth B is:

$$R = \sum_{i=1}^{N} R_i,$$

where $R_i$ is the number of bits per signal block carried by the i-th sub-carrier. Given conditions upon channel features (channel frequency response and frequency spectrum density of noise), power allocation, modulated signaling (such as QAM, the Quadrature Amplitude Modulation), bit error rate (BER) requirement, and power margin, the maximum number of bits $R_i$ per signal block transmissible by the i-th sub-carrier can be computed by the well-known equation [ref] of:

$$R_i = \log_2\left(1 + \frac{P_i \gamma_i}{\gamma_m \gamma_b}\right),$$

where $\gamma_m$ is the power margin for overcoming abrupt attenuation or additional noise appearing at the sub-carriers of a time varying channel and $\gamma_b$ is the "SNR gap" in the well-known "gap approximation" [ref]. For example, $\gamma_b = 9$ dB if a theoretical limit bit error rate $\epsilon = 10^{-7}$.

To maximize the total number of transmission bits, D, of one signal block in a multi-carrier system without violating the system constraint of maximal transmission power $P_{max}$, the mathematical expressions are given below:

$$\max\left\{\sum_{0}^{N-1} d_i = D\right\}$$

-continued $$\text{subject to } \left\{ \sum_{0}^{N-1} P_i \leq P_{max} \right\}.$$

As cited, Campello's first bit loading algorithm could be applied in the prior art to achieve the purpose. Let $P_i(d_i)$ represent the transmission power allocated at the i-th sub-carrier with $d_i$ bits, $\Delta d$ represent the number of bit increment of one adjustment (for example, in the Campello's first algorithm, $\Delta d=1$) for bit loading, and $\Delta P_i(d_i)$ represent the power increment required for increasing the number of transmission bits from $(d_i-\Delta d)$ to $d_i$. Then, $\Delta P_i(d_i)$ can be represented by the following equation, $$\Delta P_i(d_i) = \begin{cases} P_i(d_i) - P_i(d_i - \Delta d) & \text{if } d_i \geq \Delta d \\ P_i(d_i) - P_i(0) & \text{if } d_i < \Delta d. \end{cases}$$

The cited bit allocation at each sub-carrier is not adjusted until both the following conditions are met:

Condition 1: $\Delta P_i(d_i) < \Delta P_j(d_j + \Delta d), \forall i, j \in \{1, 2, \cdots, N\}$, and Condition 2: $0 \leq P_{max} - \sum_{i=1}^{N} P_i(d_i) < \min_j \Delta P_j(d_j + \Delta d)$.

In fact, the aforementioned purpose can also be achieved by means of any bit loading algorithm in a multi-carrier system.

However, a high peak to average power ratio (PAPR) possibly occurs not only before applying any bit loading algorithm but also after doing that. An OFDM system or a multi-carrier system with high PAPR usually incurs incremental complexity and reduced efficiency on the application of an analog-to-digital converter (ADC), digital-to-analog converter (DAC), power amplifier (PA) or line driver (LD).

Therefore, it is desirable to provide an improved PAPR reduction method to mitigate and/or obviate the aforementioned problems.

SUMMARY OF THE INVENTION

The objective of the present invention is to provide a peak to average power ratio (PAPR) reduction method using bit reallocation, such that the probability of PAPR larger than a predetermined value does not exceed a predetermined probability, thereby concurrently having low power and low PAPR.

To achieve the objective, the inventive PAPR reduction method is applied to a multi-carrier system, which transmits signal blocks, each of which consists of D-bit data, through N sub-carriers over a channel. The channel is with N frequency segments corresponding to the N sub-carriers. The inventive PAPR reduction method includes an initializing step, a PAPR computing step, a comparing step and an adjusting step. In the initializing step, a bit loading algorithm is initialized to allocate the number of bits at each sub-carrier for efficient data transmission. In the PAPR computing step, the PAPR for the transmission of one signal block in the multi-carrier system is computed according to number of bits and also the modulation of these bits at the sub-carriers. When the PAPR is larger than a predetermined value (the comparing step), the adjusting step is performed by increasing $\Delta d$ bits in the transmission at a first selected sub-carrier and decreasing $\Delta d$ bits in the transmission at a second selected sub-carrier. Next, the PAPR computing step is performed again, wherein the PAPR computing step to the adjusting step are not repeated until the PAPR is less than the predetermined value or until a predetermined maximal number of iteration is reached.

Other objectives, advantages, and novel features of the invention will become more apparent from the following detailed description when taken in conjunction with the accompanying drawings.

DETAILED DESCRIPTION OF THE PREFERRED EMBODIMENT

Figure 1:
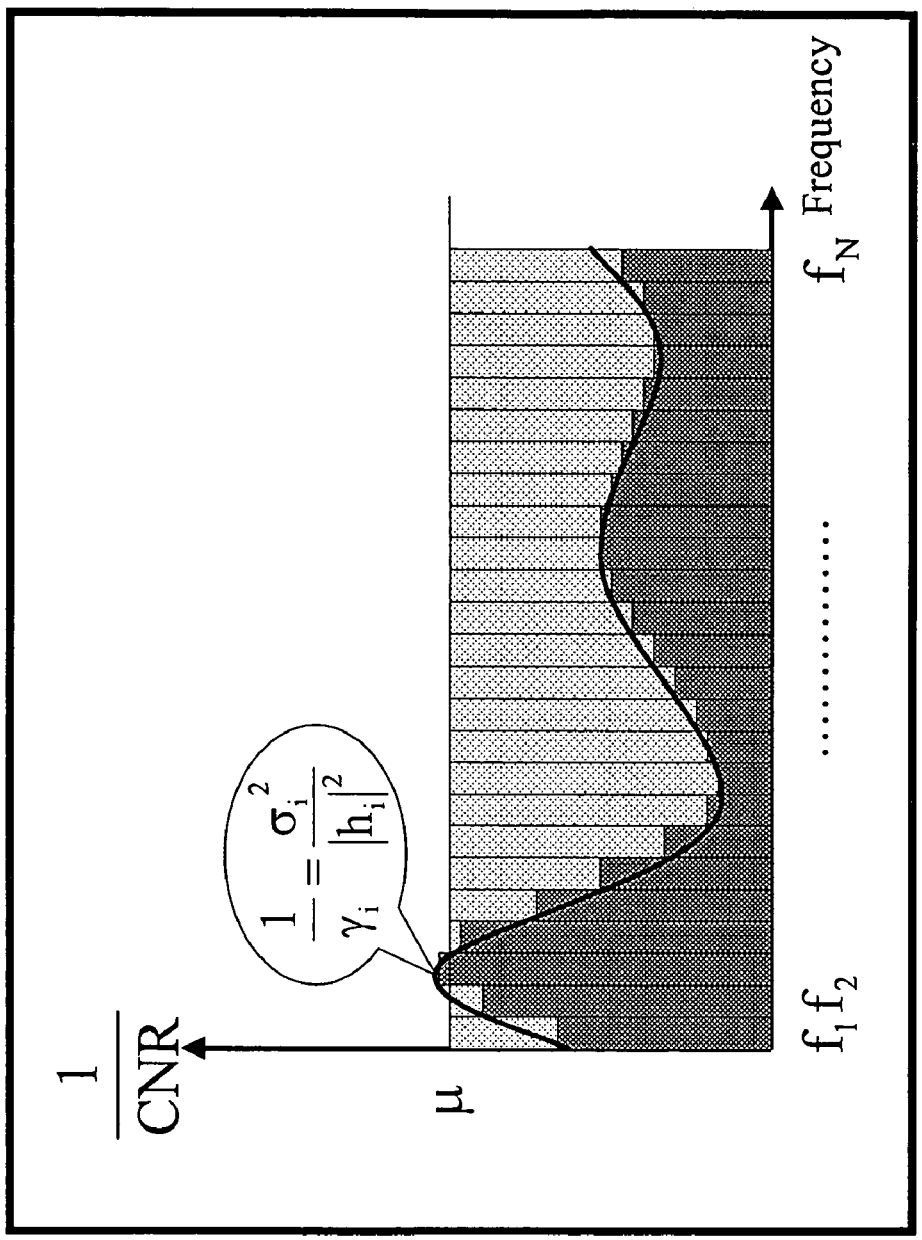
FIG. 1 is a graph illustrating a typical Water-filling technique used for power allocation to achieve channel capacity and best spectral efficiency in a frequency selective channel.
Figure 2:
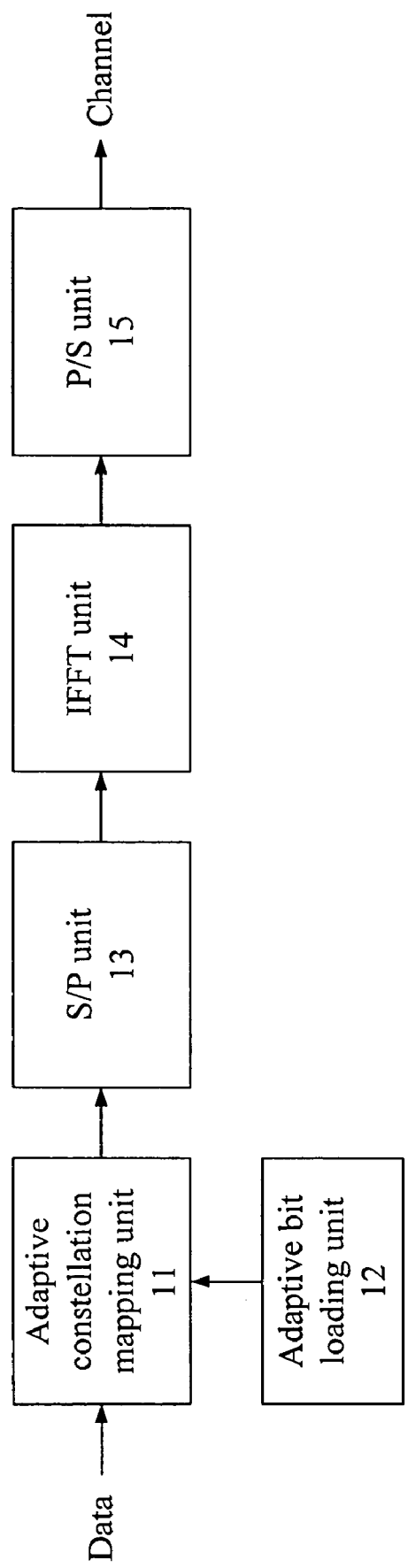
FIG. 2 shows a schematic diagram of functional blocks of a transmitting end with a typical adaptive bit loading algorithm.
Figure 3:
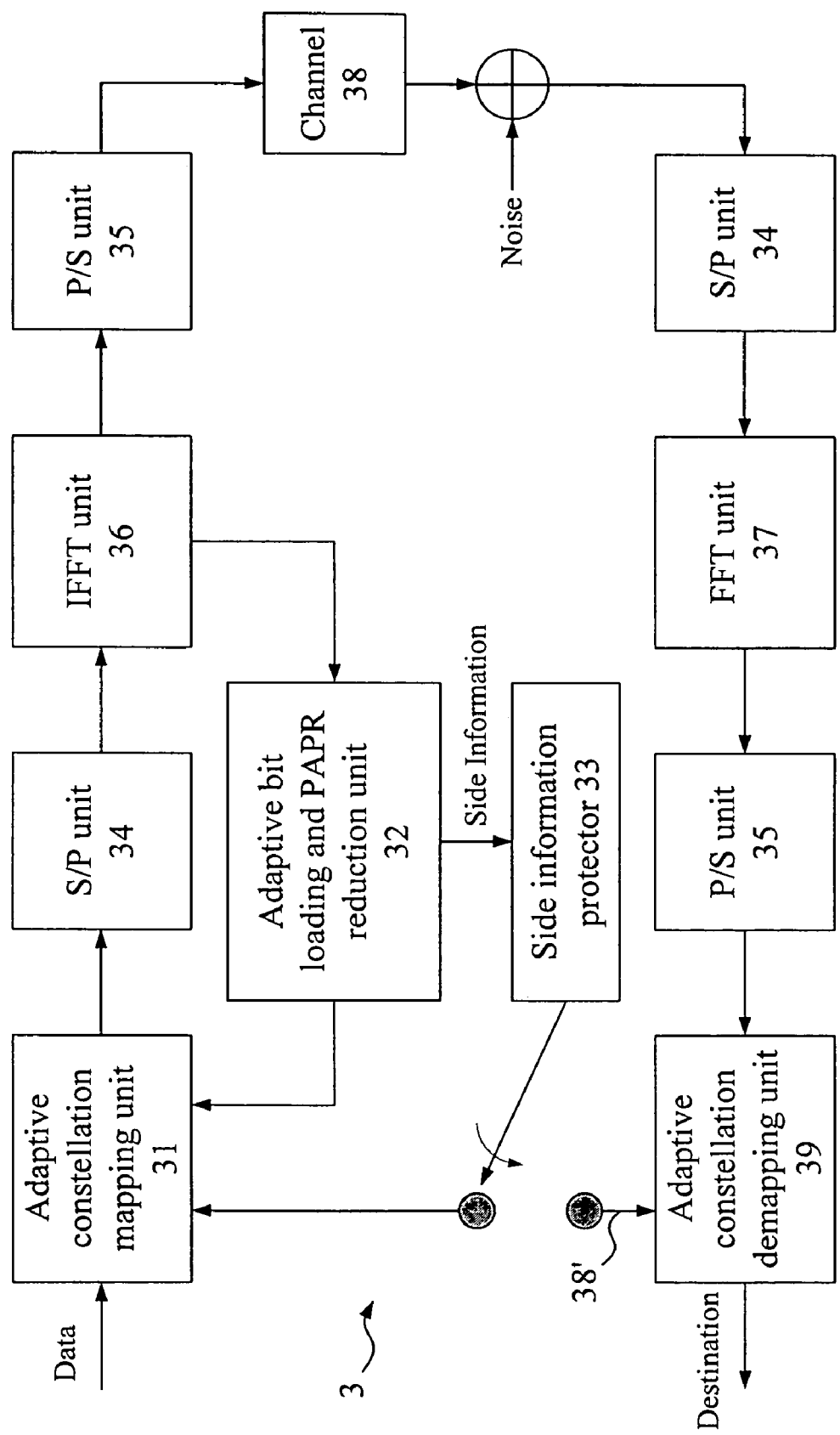
FIG. 3 is a block diagram of a PAPR reduction method using bit reallocation according to an embodiment of the present invention.

With reference to FIG. 3, there is shown an embodiment of functional blocks of a multi-carrier system 3 (for example, an orthogonal frequency division multiplexing (OFDM) system). In FIG. 3, the system 3 includes an adaptive constellation mapping unit 31, an adaptive bit loading and PAPR (peak to average power ratio) reduction unit 32, a side information protector 33, a serial to parallel (S/P) unit 34, a parallel to serial (P/S) unit 35, an inverse fast Fourier transform (IFFT) unit 36, a fast Fourier transform (FFT) unit 37 and an adaptive constellation demapping unit 39. The cited devices, which can easily be implemented by a person in the art except for the unit 32 and the protector 33, will not be described in detail. In the following description, unit 32 essentially performs bit reallocation at the sub-carriers for reducing PAPR and protector 33 essentially protects the side information due to bit reallocation.

Figure 4:
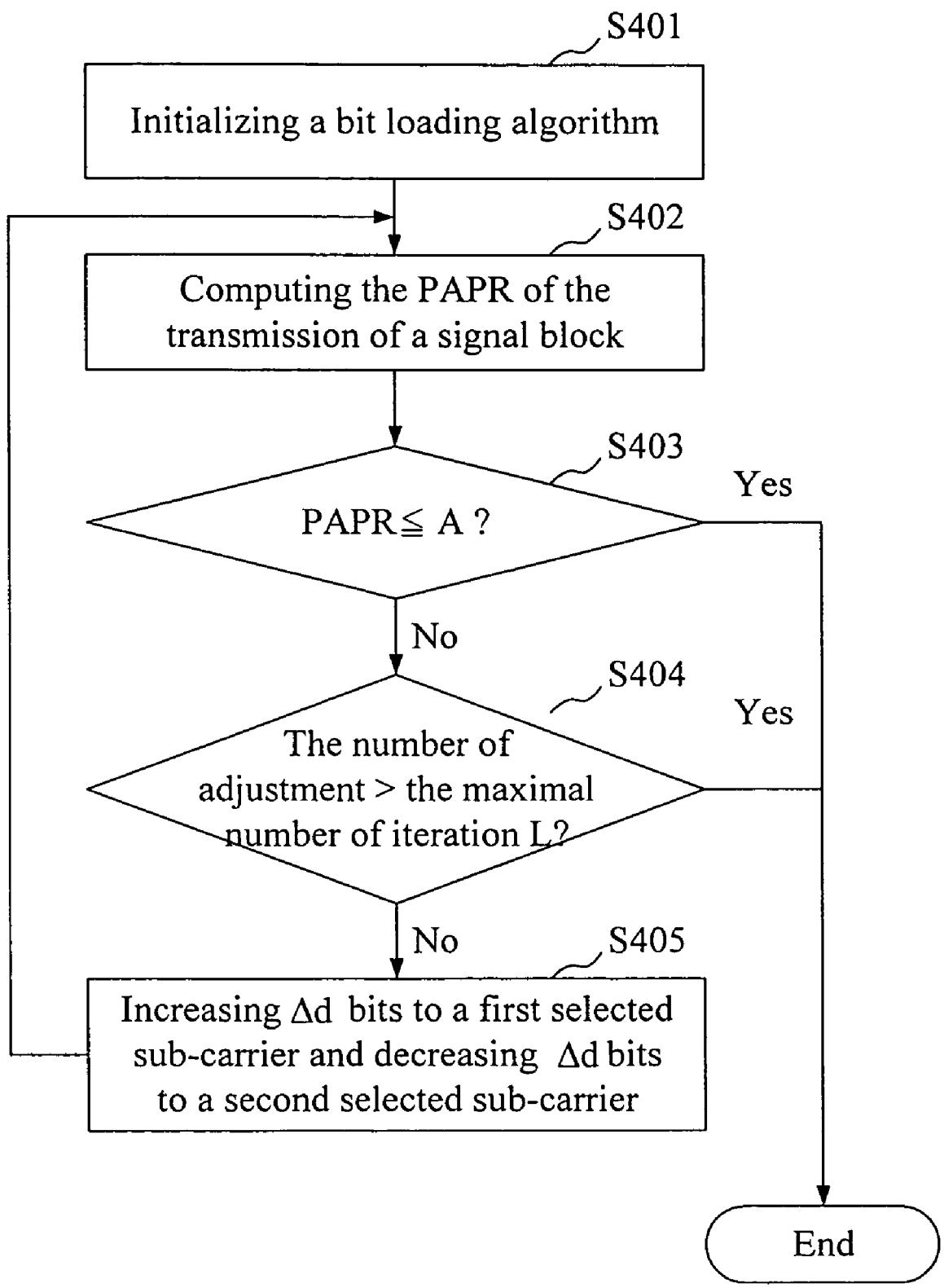
FIG. 4 is a flowchart of a PAPR reduction method using bit reallocation according to the embodiment of the present invention.

FIG. 4 is a flowchart of a PAPR reduction method using bit reallocation according to the embodiment of the invention. The transmitter of system 3 transmits data through N sub-carriers over a channel 38 which is with N frequency segments corresponding to the N sub-carriers. Accordingly, as shown in FIG. 4, a bit loading algorithm is initialized to allocate $d_i$ bits at each sub-carrier for transmission of one signal block (step S401), where $0 \leq i \leq (N-1)$. In this embodiment, assume that the total number of bits of transmitting one signal block be D bits, the goal to achieve the lowest total transmission power of the system can be mathematically expressed as follows:

$$\min\left\{\sum_{0}^{N-1} P_i\right\}$$

$$\text{subject to } \left\{\sum_{0}^{N-1} d_i = D\right\}.$$

Figure 5:
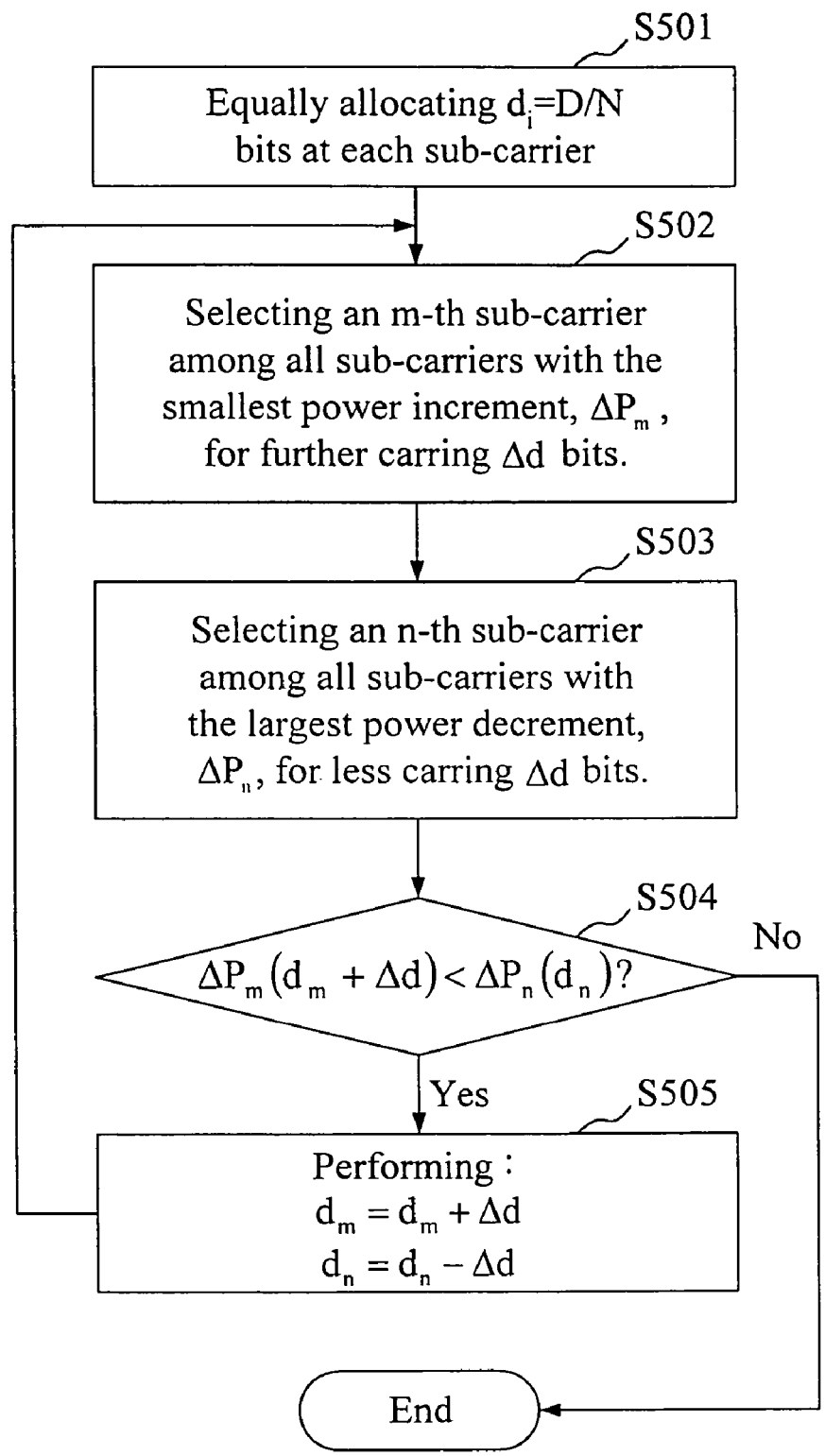
FIG. 5 is a flowchart of step S401 of FIG. 4 according to the embodiment of the present invention.

With reference to FIG. 4 and also FIG. 5, a flowchart of an initializing step S401 of FIG. 5 is described in detail. In FIG. 5, the initializing step applies a bit loading algorithm to allocate the number of bits at each sub-carrier. In this embodiment, Campello's second bit loading algorithm is not applied to adjust bit allocation at each sub-carrier until the following condition (same Condition 1 as in the prior art) is met:

$\Delta P_i(d_i) < \Delta P_j(d_j + \Delta d)$, $\forall i, j \in \{1, 2, \ldots, N\}$.   Condition 1

Note that other bit loading algorithm can also be applied to our inventive PAPR reduction method. One possible process to execute Campello's second algorithm is shown in FIG. 5. As shown in the first block of FIG. 5, each sub-carrier is at first equally allocated with same number of bits, i.e. $d_i = D/N$ where $0 \leq i \leq (N-1)$ (step S501). In the second block, by comparing the power increment at all sub-carriers, each of which is increased by $\Delta d$-bit (such as 1-bit, 2-bit, ..., etc.), an m-th sub-carrier with the smallest power increment, $\Delta P_m$, among all sub-carriers is selected, where $$m = \arg\left[\min_{0 \leq i \leq N-1} \Delta P_i(d_i + \Delta d_i)\right]$$

(step S502). In the third block, by comparing the power decrement at all sub-carriers, each of which is decreased by $\Delta d$-bit, an n-th sub-carrier with the largest power decrement, $\Delta P_n$, among all sub-carriers is selected, where $$n = \arg\left[\max_{0 \leq i \leq N-1} \Delta P_i(d_i)\right]$$

(step S503). It is noted that the steps S502 and S503 can be exchanged or merged into one step. To achieve the lowest total transmission power with the constraint of total D transmitted bits per signal block, the power increment, $\Delta P_m$, at the m-th sub-carrier which carries more $\Delta d$-bit is compared to the power decrement, $\Delta P_n$, at the n-th sub-carrier which carries less $\Delta d$-bit in the fourth block (step S504). Then, an adjusting operation that more $\Delta d$-bit is increased at the m-th sub-carrier and decreased at the n-th sub-carrier is performed in the fifth block (step S505). Steps S504 and S505 can be explained in more detail as follows.

When $\Delta P_m(d_m + \Delta d) < \Delta P_n(d_n)$, $\forall m, n \in \{1, 2, \ldots, N\}$, the following steps are performed:

$d_m = d_m + \Delta d$, and $d_n = d_n - \Delta d$.

On the contrary, when $\Delta P_m(d_m + \Delta d) \geq \Delta P_n(d_n)$, $\forall m, n \in \{1, 2, \ldots, N\}$, the total transmission power can not be reduced anymore, the process is over.

After determining the carrying data $d_i$ at the i-th sub-carriers by the bit loading algorithm, an IFFT operation is used to compute the PAPR of the transmission of one signal block in the multi-carrier system 3 (step S402). The PAPR may still be large even that the smallest total transmission power is reached. To avoid this circumstance, the following operations are performed. When the PAPR of the transmission is larger than a predetermined value A (e.g. 6 dB) (step S403), the bit reallocation is performed to reduce the PAPR such that the PAPR is not larger than A. Accordingly, the mathematical expressions to achieve the lowest total transmission power P are modified as follows:

$$\min\left\{\sum_{0}^{N-1} P_i\right\}$$

$$\text{subject to } \begin{cases} PAPR \leq A \\ \sum_{0}^{N-1} d_i = D \end{cases}.$$

Namely, if the PAPR of the transmission of one signal block after being processed by the initial bit loading algorithm is large, the signal block needs to perform bit reallocation operation in order to reduce the PAPR. Continuing the bit allocation operation of the bit loading algorithm even when the constraint, $\Delta P_m(d_m + \Delta d) \geq \Delta P_n(d_n)$, $\forall m, n \in \{1, 2, \ldots, N\}$, is reached is one possible bit reallocation solution. That is, $\Delta d$ bits are increased to a selected sub-carrier and decreased to another selected sub-carrier (step S405) in similar bit allocation operations (steps S502, S503, S505, ignoring step S504), thereby maintaining the entire multi-carrier system 3 in a fixed transmission rate. The selection is still according to the power incremental/decremental equation:

$$\Delta P_i(d_i) = \begin{cases} P_i(d_i) - P_i(d_i - \Delta d) & \text{if } d_i \geq \Delta d \\ P_i(d_i) - P_i(0) & \text{if } d_i < \Delta d. \end{cases}$$

The operations are not executed until a predetermined maximal iteration number L is reached (step S404). The cited step S405 is defined as one adjustment. After one adjustment is complete and thus a new bit allocation at each sub-carrier is generated, the PAPR is re-computed in accordance with the new bit allocation at each sub-carrier (step S402). Then, comparing the re-computed PAPR to the predetermined value A and accordingly determining if the re-computed PAPR meets with the system constraint (step S403). If the answer is "yes", the process is over. The cited PAPR comparison is not performed until the number of adjustment exceeds the predetermined maximal iteration number L (step S404). The predetermined maximal number of iteration L is defined for the purpose of reducing system load. For example, if the largest number of adjustment is T for the multi-carrier system using N sub-carriers, the operation ends after at most L adjustment number is performed, even if the PAPR cannot meet with the system constraint.

Figure 6:
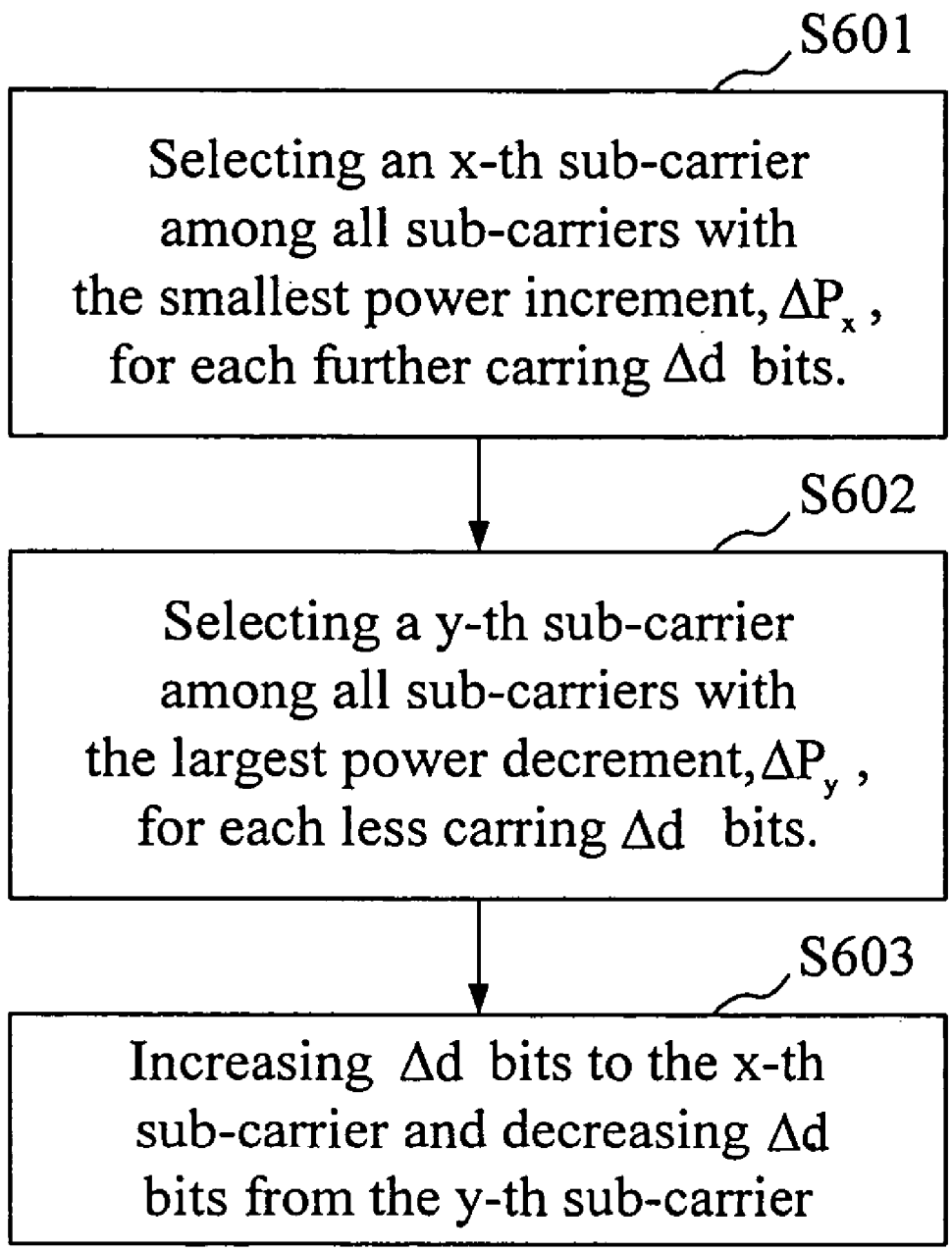
FIG. 6 is a flowchart of an example step S405 of FIG. 4 according to the embodiment of the present invention.

With reference to the flow chart of FIG. 5 and that of FIG. 6, steps S502, S503 and steps S601, S602 fully search around all sub-carriers for the bit reallocation operation. Similar to steps S502, S503 of FIG. 5, in steps S601, S602 of FIG. 6, by comparing the power increment at all sub-carriers, each of which is increased by $\Delta d$ bits, an x-th sub-carrier with the smallest power increment $\Delta P_x$ among all sub-carriers is selected, wherein $$x = \arg\left[\min_{0 \leq i \leq N-1} \Delta P_i(d_i + \Delta d_i)\right]$$

(step S601). By comparing the power decrement at all sub-carriers, each of which is decreased by Δd bits, a y-th sub-carrier with the largest power decrement $\Delta P_y$ decreasing among all sub-carriers is selected, wherein $$y = \arg\left[\max_{0 \leq i \leq N-1} \Delta P_i(d_i)\right]$$

(step S602). Then Δd-bit carrying data is increased at the x-th sub-carrier and decreased at the y-th sub-carrier (step S603). The cited steps S601 and S602 can be exchanged in operation or merged into one step.

Figure 7:
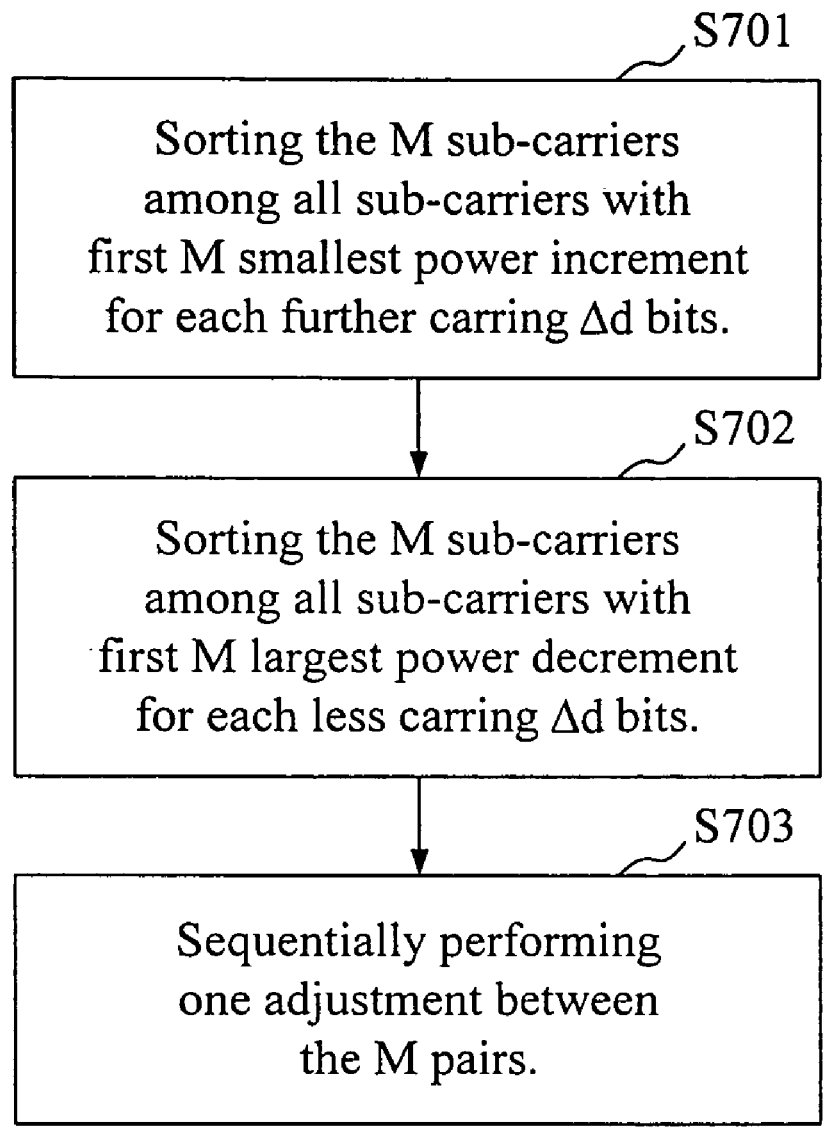
FIG. 7 is a flowchart of another example step S405 of FIG. 4 according to the embodiment of the present invention.

FIG. 7 shows a flow chart of another preferred search process for step S405. As shown in the first block of FIG. 7, the individually incremental power required for increasing Δd-bit transmission at each sub-carrier is sorted from small to large. The first smallest M incremental power for transmission at the M sub-carriers is selected (step S701), where M≦N. On the other hand, as shown in the second block of FIG. 7, the individually decremental power required for decreasing Δd-bit transmission is sorted from large to small. The first largest M decremental power at the M sub-carriers is selected (step S702). The Δd-bit increment/decrement at these selected sub-carriers are sequentially applied to one adjustment (step S703).

In practice, the system constraint for bit error rates at different sub-carriers can be set to $\epsilon_1 = \epsilon_2 = \ldots = \epsilon_N = \epsilon$, or looser. Namely, power allocation is adjusted by the following equation according to the constraint of bit error rates at different sub-carriers.

$$R_i = \log_2\left(1 + \frac{P_i \gamma_i}{\gamma_m \gamma_b}\right).$$

After bit reallocation is complete, the number of bits carried at each sub-carrier is possibly changed. As such, the multi-carrier system 3 needs additional information delivery, i.e., side information. In this embodiment, the side information protector 33 is fed back to the adaptive constellation mapping unit 31 or delivered over an additional channel 38'. Efficient error correction code can be applied to protect the side information.

As cited, the inventive method applies bit loading and bit reallocation techniques to effectively reduce PAPR and concurrently obtain a low power target.

Although the present invention has been explained in relation to its preferred embodiment, it is to be understood that many other possible modifications and variations can be made without departing from the spirit and scope of the invention as hereinafter claimed.

What is claimed is:

1. A PAPR (peak to average power ratio) reduction method using bit reallocation, applied in a multi-carrier system, a transmitter of the multi-carrier system transmitting D-bit data at N sub-carriers over a channel, the method comprising the steps of:

an initializing step, for initializing a bit loading algorithm to allocate $d_i$ bits required at the i-th sub-carrier for data transmission, wherein 0≦i≦(N−1);

a PAPR computing step, for computing the PAPR of the multi-carrier system in accordance with $d_i$ bits transmitted at the i-th sub-carrier;

a comparing step, for determining if the PAPR is larger than a predetermined value A, and if yes, terminating the PAPR reduction method; and an adjusting step, for performing an adjustment of increasing Δd bits at a first selected sub-carrier and decreasing Δd bits from a second selected sub-carrier, and then executing the PAPR computing step.

2. The method as claimed in claim 1, wherein the multi-carrier system is an orthogonal frequency division multiplexing (OFDM) system.

3. The method as claimed in claim 1, wherein the bit loading algorithm can be any bit loading algorithm and any adaptive bit loading algorithm.

4. The method as claimed in claim 1, wherein the bit loading algorithm applies Campello's second bit loading algorithm.

5. The method as claimed in claim 4, wherein the initializing step includes the steps of:

a distributing step, for equally distributing D bits around all sub-carriers such that the i-th sub-carrier carries bits, wherein, for 0≦i≦(N−1);

a first smallest selecting step, by comparing a power increment at all sub-carries, each of which is increased by Δd bits, for selecting an m-th sub-carrier with the smallest power increment $\Delta P_m$ among all sub-carriers, wherein;

a first largest selecting step, by comparing a power decrement at all sub-carries, each of which is decreased by Δd bits, for selecting an n-th sub-carrier with the largest power decrement $\Delta P_n$ among all sub-carriers it, wherein;

a comparing step, for comparing whether the power increment $\Delta P_m$ is less than the power decrement $\Delta P_n$, and if yes, executing the next step; and a first adjusting step, for increasing Δd bits to the m-th sub-carrier and decreasing Δd bits to the n-th sub-camer.

6. The method as claimed in claim 5, wherein the first smallest selecting step and the first largest selecting step can be exchanged or merged into one step in the PAPR reduction method.

7. The method as claimed in claim 1, wherein the adjusting step includes the steps of:

a second smallest selecting step, by comparing a power increment at all sub-carries, each of which is increased by Δd bits, for selecting an x-th sub-carrier as a first sub-carrier with the smallest power increment $\Delta P_x$ among all sub-camers, wherein a second largest selecting step, by comparing a power decrement at all sub-carries, each of which is decreased by Δd bits, for selecting a y-th sub-carrier as a second sub-carrier with the largest power decrement $\Delta P_y$ among all sub-carriers, wherein; and a second adjusting step, for increasing Δd bits to the x-th sub-carrier and decreasing Δd bits to the y-th sub-carrier.

8. The method as claimed in claim 7, wherein the second smallest selecting step and the second largest selecting step can be exchanged or merged into one step in the process PAPR reduction method.

9. The method as claimed in claim 1, wherein the adjusting step includes the following steps of:
- a third smallest selecting step, by comparing a power increment at all sub-carries, each of which is increased by $\Delta d$ bits, for selecting first M sub-carriers with first M smallest power increment, among all sub-carriers, wherein $M \leq N$;
- a third largest selecting step, by comparing a power decrement at all sub-carries, each of which is decreased by $\Delta d$ bits, for selecting first M sub-carriers with first M largest power decrement among all sub-carriers; and
- a third adjusting step, for increasing $\Delta d$ bits to one of the M sub-carriers with the first M smallest power increment and decreasing $\Delta d$ bits to one of the M sub-carriers with the first M largest power decrement.

10. The method as claimed in claim 9, wherein the third smallest selecting step and the third largest selecting step can be exchanged or merged into one step in the PAPR reduction method.

11. The method as claimed in claim 1, further comprising an iteration comparing step, which determines if the number of iteration is less than a predetermined maximal number of iteration L, and if yes, executing the adjusting step.

12. The method as claimed in claim 1, wherein the PAPR is computed by an inverse fast Fourier transform (IFFT) algorithm.

13. The method as claimed in claim 1, wherein after the adjusting step, the transmitter of the multi-carrier system transmits side information about the bit reallocation to a receiver through the original N sub-carriers over the original channel or through another method over an additional channel.

14. The method as claimed in claim 13, wherein when the transmitter of the multi-carrier system transmits the side information, a side information protector protects the side information.

15. The method as claimed in claim 14, wherein the side information protector applies an error correction code to protect the side information.

* * * * *